United States Patent [19]

Hugl et al.

[11] 4,249,275
[45] Feb. 10, 1981

[54] PROCESS FOR DYEING AND PRINTING CELLULOSE FIBRES

[75] Inventors: Herbert Hugl, Leverkusen; Gerhard Wolfrum, Leverkusen; Henning Reel, Cologne; Werner Künnel, Leverkusen; Robert Kuth, Cologne; Wilhelm Gohrbandt, Leverkusen, all of Fed. Rep. of Germany

[73] Assignee: Bayer Aktiengesellschaft, Leverkusen, Fed. Rep. of Germany

[21] Appl. No.: 140,349

[22] Filed: Apr. 14, 1980

[30] Foreign Application Priority Data

Apr. 26, 1979 [DE] Fed. Rep. of Germany ....... 2916861

[51] Int. Cl.³ .............................................. D06P 3/82
[52] U.S. Cl. .......................................... 8/532; 8/662; 260/157; 260/165; 260/205
[58] Field of Search .................................. 8/532, 662

[56] References Cited

U.S. PATENT DOCUMENTS

| | | | |
|---|---|---|---|
| 3,653,800 | 4/1972 | Blackwell | 8/532 |
| 3,656,880 | 4/1972 | Blackwell | 8/532 |
| 3,706,525 | 12/1972 | Blackwell et al. | 8/532 |
| 3,711,245 | 1/1973 | Neumer | 8/532 |
| 3,759,963 | 9/1973 | McGuire | 8/532 |
| 4,049,377 | 9/1977 | Schwab et al. | 8/532 |
| 4,083,684 | 4/1978 | Hansen et al. | 8/532 |

FOREIGN PATENT DOCUMENTS 2715135 10/1978 Fed. Rep. of Germany .
2008607 6/1979 United Kingdom .

*Primary Examiner*—A. Lionel Clingman
*Attorney, Agent, or Firm*—Sprung, Felfe, Horn, Lynch & Kramer

[57] ABSTRACT

For dyeing and printing cellulose fibers swollen with water-miscible swelling agents or fibre blends containing these fibres, the fibres are treated with dyestuffs of the general formula

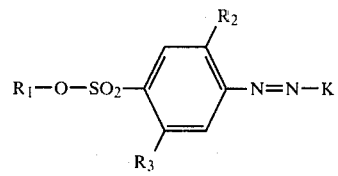

wherein
 $R_1$ represents aryl,
 $R_2$ represents halogen, CN, $CF_3$, $NO_2$, $Q_1$, $-OQ_1$, $-COOQ_1$, $CONQ_1Q_2$ or $-NHCOQ_1$,
 $R_3$ represents H, halogen, CN, $CF_3$, $Q_1$ or $-OQ_1$ and
 K represents the radical of a coupling component,
wherein
 $Q_1$ denotes alkyl or aryl and
 $Q_2$ denotes hydrogen, alkyl or aralkyl,
and the dyestuffs are fixed by heat treatment.

9 Claims, No Drawings

PROCESS FOR DYEING AND PRINTING CELLULOSE FIBRES

The invention relates to a process for dyeing and printing cellulose fibres swollen with water-miscible swelling agents or fibre blends containing these fibres.

The process is characterised in that the fibres are treated with a dyestuff of the general formula

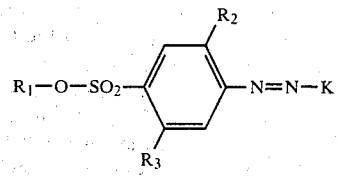

wherein
$R_1$ represents aryl,
$R_2$ represents halogen, CN, $CF_3$, $NO_2$, $Q_1$, $-OQ_1$, $-COOQ_1$, $-CONQ_1Q_2$ or $-NHCOQ_1$,
$R_3$ represents H, halogen, CN, CFhd 3, $Q_1$ or $-OQ_1$ and
K represents the radical of a coupling component, wherein
$Q_1$ denotes alkyl or aryl and
$Q_2$ denotes hydrogen, alkyl or aralkyl,
and the dyestuff is fixed by heat treatment.

The invention also relates to dyestuff formulations, which contain a dyestuff of the formula (I), for dyeing and printing cellulose and cellulose-containing fibre material.

The dyestuffs of the formula (I) are free from substituents which confer water-solubility. The alkyl, aralkyl and aryl radicals mentioned can contain further non-ionic substituents.

Suitable alkyl within the scope of this invention is, in particular, alkyl with 1 to 4 C atoms, which can optionally be further monosubstituted by cyano, halogen, such as chlorine, bromine or fluorine, hydroxyl or $C_1$-$C_4$-alkoxy, for example methyl, ethyl, n-propyl, iso-propyl, n-butyl, tert.-butyl, cyanoethyl or 2-chloroethyl.

Suitable aryl is, in particular, phenyl which is optionally mono-, di- or tri-substituted by halogen, $C_1$-$C_4$-alkyl, $C_1$-$C_4$-alkoxy, nitro, cyclohexyl or phenyl.

"Bulky" radicals are in those positions where they cause no steric hindrance, for example tert.-butyl in the m- or p-position of a phenyl radical.

Suitable halogen is chlorine, bromine or fluorine, but preferably chlorine.

Suitable aralkyl is, for example, benzyl or phenethyl.

Dyestuffs of the formula (I) wherein K represents the radical of an aniline coupling component which couples in the 4-position, the radical of an indole coupling component which couples in the 3-position or the radical of a 5-aminopyrazole coupling component which couples in the 4-position, are used in particular.

Preferred dyestuffs correspond to the formulae

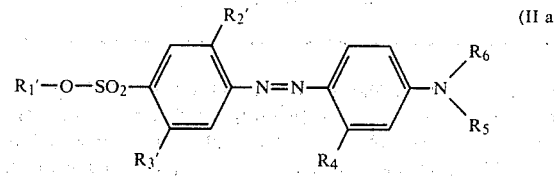

wherein
$R_1'$ represents phenyl, which is optionally mono-, di- or tri-substituted by $C_1$-$C_4$-alkyl or halogen,
$R_2'$ represents halogen, CN, $CF_3$, $NO_2$, $C_1$-$C_4$-alkyl or $C_1$-$C_4$-alkoxy,
$R_3'$ represents halogen, CN, $CF_3$, $C_1$-$C_4$-alkyl or $C_1$-$C_4$-alkoxy,
$R_4$ represents hydrogen, halogen, alkyl, $-NHCOQ_1$, $-NHSO_2Q_1$, $-NHCONH_2$, $-NHCONQ_1Q_2$, $-NHCOCF_3$, $-NHCOOQ_1$, alkoxy or $-O-SO_2-Q_1$,
$R_5$ and $R_6$, which can be identical or different, represent hydrogen, $C_1$-$C_4$-alkyl, $-C_1$-$C_4$-alkylene—O—CO—$Q_1$, $C_1$-$C_4$-alkylene—O—CO—O—$Q_1$, $C_1$-$C_4$-alkylene—CO—O—$Q_1$, $C_1$-$C_4$-alkylene—CONQ_1Q_2$, $C_1$-$C_4$-alkylene—O—$Q_1$, $C_1$-$C_4$-alkylene—O—CO—NH—$Q_1$, $C_1$-$C_4$-alkylene—O—$SO_2$—$Q_1$, aralkyl, $-CH_2-CH=CH_2$ or $-CH_2CH_2CN$ and
$Q_1$ and $Q_2$ have the abovementioned meaning.

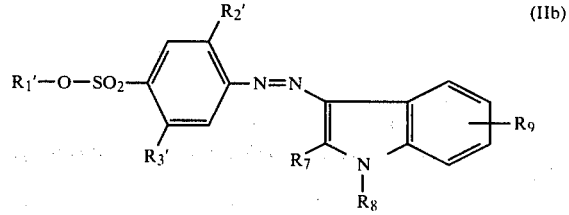

wherein
$R_7$ represents $C_1$-$C_4$-alkyl or phenyl,
$R_8$ represents $C_1$-$C_4$-alkyl, benzyl or phenethyl,
$R_9$ represents hydrogen, halogen or alkyl and
$R_1'$, $R_2'$ and $R_3'$ have the abovementioned meaning. and

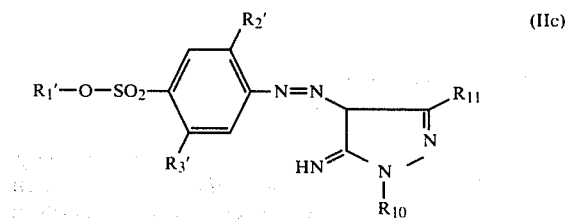

wherein
$R_{10}$ represents $Q_2$, aryl, cycloalkyl or the radical of a heterocyclic compound and
$R_{11}$ represents $Q_1$, $-COOQ_2$ or $-CON(Q_2)_2$,
and wherein
$R_1'$, $R_2'$, $R_3'$, $Q_1$ and $Q_2$ have the abovementioned meaning.

Particularly preferred dyestuffs are those of the formulae

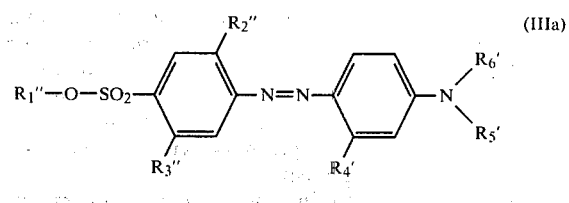

wherein $R_1''$ represents phenyl, tolyl or chlorophenyl,
$R_2''$ represents halogen, nitro or cyano,
$R_3''$ represents halogen,
$R_4'$ represents —NHCOCH$_3$, —NHCOC$_2$H$_5$, —NHCOC$_3$H$_7$, —NHCOC$_4$H$_9$, —NHCOC$_6$H$_5$ or —NHSO$_2$CH$_3$, —NHSO$_2$C$_4$H$_9$ or —NHSO$_2$C$_6$H$_5$ and
$R_5'$ and $R_6'$, which can be identical or different, represent —C$_2$H$_4$—O—CO—CH$_3$, —C$_2$H$_4$—O—COC$_2$H$_5$, —C$_2$H$_4$—O—CO—C$_6$H$_5$, —C$_2$H$_4$—O—CO—O—CH$_3$, —C$_2$H$_4$—O—CO—O—C$_2$H$_5$, —C$_2$H$_4$—O—CO—NH—CH$_3$, —C$_2$H$_4$—O—CO—NH—C$_4$H$_9$, —C$_2$H$_4$—O—CO—NH—C$_6$H$_5$ or —C$_2$H$_4$CN;

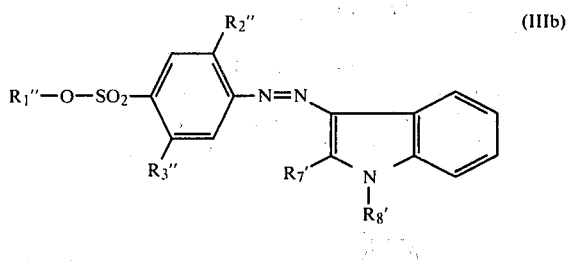

(IIIb)

wherein
$R_7'$ represents phenyl,
$R_8'$ represents C$_1$-C$_4$-alkyl and
$R_1''$, $R_2''$ and $R_3''$ have the abovementioned meaning; and

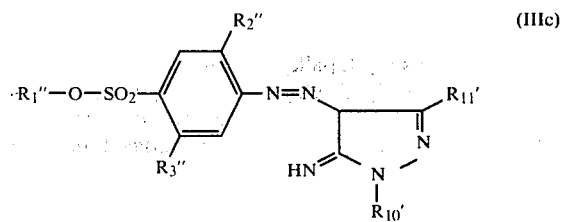

(IIIc)

wherein
$R_{10}'$ represents phenyl and
$R_{11}'$ represents methyl,
and wherein
$R_1''$, $R_2''$ and $R_3''$ have the abovementioned meaning.

The dyestuffs of the formula (I) are known; their preparation is described in German Offenlegungsschrift (German Published Specification) No. 2,715,135 and German Patent Applications Nos. 27 52 424.9 and 28 51 575.5.

It has now been found that the dyestuffs of the formula (I), which are free from fibre-reactive groups, are outstandingly suitable for dyeing and printing cellulose fibres which can be swollen in water and fibre blends containing these fibres when they are applied by the process known from DE-AS (German Published Specification) No. 1,811,796. In this process, the fibres are brought into contact with an amount of water sufficient to swell the cellulose and with a water-miscible swelling agent before or at the same time as the treatment with the dyestuff. The swelling agent must be capable of maintaining the swelling of the cellulose when the water is removed and of dissolving the dyestuff at the dyeing temperature, if appropriate with the aid of an additional solubilising agent.

The swelling agent is in general added in an amount of 10 to 30% by weight, relative to the cellulose fibres.

Suitable swelling agents have a boiling point above 150° C.

The dyestuff and swelling agent can be applied simultaneously to the fibre, or the fibre can be treated first with the swelling agent and then with the aqueous dyestuff dispersion.

Finally, the dyestuff is fixed by heat treatment, in particular at 150°-230° C.

The process is suitable for dyeing and printing both natural cellulose and regenerated cellulose.

The process is of particular interest for dyeing and printing fibre blends of cellulose and synthetic fibres, such as polyamide and polyester fibres, in particular cotton/polyester fibre blends, since it makes matching shade dyeing or printing in a single procedure possible.

Processes of this type and further auxiliaries which can be used instead of the products known from DE-AS (German Published Specification) No. 1,811,796 are known, for example, from German Offenlegungsschriften (German Published Specifications) Nos. 2,524,243, 2,528,743 and 2,751,830.

The dyestuffs (I) give dyeings and prints, the colour shades of which are between yellow and red and match well on the fibre blends. They are distinguished by very good fastness properties, and in addition to fastness to washing, fastness to sublimation, light and dry cleaning should above all be singled out.

The dyestuff formulations according to the invention can contain, in addition to water, customary constituents, such as dispersing agents, for example non-ionic and/or anionic and/or cationic dispersing agents, thickeners and/or swelling agents and/or dyestuff solubilising agents.

The parts mentioned in the examples below are parts by weight and the degrees are degrees Centigrade.

EXAMPLE 1

(a) 50-200 parts of the dyestuff of the formula

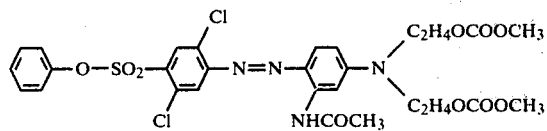

are brought together with 25 to 100 parts of a non-ionic dispersing agent, the mixture is made up to 1,000 parts with water and dispersion is then effected in a ball mill or another suitable apparatus. In order to prevent the dyestuff paste from drying out too rapidly, a small amount of preservative and glycols or glycerol can also be added to the paste.

(b) A PES/CO 50:50 fabric is printed with a printing paste consisting of

| | |
|---|---|
| 1-50 parts | of the dyestuff paste from paragraph a) |
| 100 parts | of polyethylene glycol (molecular weight: about 400) |
| 399-350 parts | of water and |
| 500 parts | of a 10% strength guar flour thickener |
| 1,000 parts | | using a rotary screen printing machine or screen printing tables. (If a roller printing machine is used, the amount of polyethylene glycol must be increased to 150-200 parts, depending on the depth of the gravure cells.)

The fabric is then dried, the dyestuff is fixed at 210° with dry heat for 1 minute and the fabric is rinsed, soaped, rinsed again and dried.

A scarlet-red print which is fast to washing and fast to light is obtained.

EXAMPLES 2-32

The procedure followed is as described in Example 1, but the dyestuffs of the formula

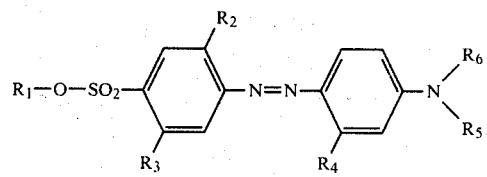

described in the following table are used.

EXAMPLES 33-53

The procedure followed is as indicated in Example 1, but the dyestuffs of the formula

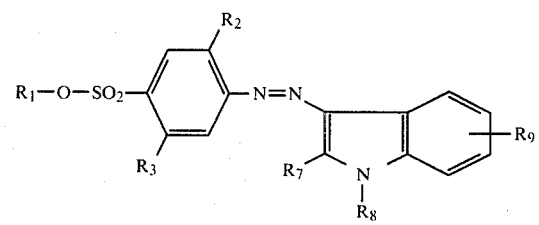

described in the table below are used.

| Ex. | $R_1$ | $R_2$ | $R_3$ | $R_4$ | $R_5$ | $R_6$ | Colour shade |
|---|---|---|---|---|---|---|---|
| 2 | $C_6H_5$ | $NO_2$ | H | $NHCOCH_3$ | $C_2H_4OCOC_6H_5$ | $C_2H_4OCOC_6H_5$ | red |
| 3 | 3-Cl—$C_6H_4$ | Cl | Cl | $NHCOCH_3$ | $C_2H_4OCOOC_2H_5$ | $C_2H_4OCOOC_2H_5$ | scarlet |
| 4 | 3-$CH_3$—$C_6H_4$ | Cl | Cl | $NHCOCH_3$ | $C_2H_4OCOOCH_3$ | $C_2H_4OCOOCH_3$ | " |
| 5 | 3-$CH_3$—$C_6H_4$ | Cl | Cl | $NHCOCH_3$ | $C_2H_4OCOOC_2H_5$ | $C_2H_4OCOOC_2H_5$ | " |
| 6 | $C_6H_5$ | Cl | Cl | $NHCOC_4H_9$ | $C_2H_4OCOCH_3$ | $C_2H_4OCOCH_3$ | " |
| 7 | 2-$CH_3$—$C_6H_4$ | Cl | Cl | $NHCOC_6H_5$ | $C_2H_4OCOC_2H_5$ | $C_2H_4OCOC_2H_5$ | " |
| 8 | 4-Cl—$C_6H_4$ | Cl | Cl | $NHSO_2CH_3$ | $C_2H_4OCONHCH_3$ | $C_2H_4OCONHCH_3$ | " |
| 9 | 3-Cl—$C_6H_4$ | Cl | Cl | $NHSO_2C_4H_9$ | $C_2H_4OCOOCH_3$ | $C_2H_4OCOOCH_3$ | " |
| 10 | $C_6H_5$ | Cl | Cl | $NHCOCH_3$ | $C_2H_4OCONHC_4H_9$ | $C_2H_4OCONHC_4H_9$ | " |
| 11 | 3-$CH_3$—$C_6H_4$ | Cl | Cl | $NHCOC_3H_7$ | $C_2H_4OCOC_6H_5$ | $C_2H_4OCOC_6H_5$ | " |
| 12 | $C_6H_5$ | Cl | Cl | $NHCOCH_3$ | $C_2H_4CN$ | $C_2H_4OCONHC_6H_5$ | " |
| 13 | 3-Cl—$C_6H_4$ | Cl | Cl | $NHSO_2C_6H_5$ | $C_2H_4OCOOCH_3$ | $C_2H_4OCOOCH_3$ | " |
| 14 | 3,5-$CH_3$—$C_6H_3$ | $CH_3$ | $CH_3$ | $NHSO_2$—(4-$CH_3$)—$C_6H_4$ | $C_2H_4OCOCH_3$ | $C_2H_4OCOCH_3$ | " |
| 15 | $C_6H_5$ | $CF_3$ | Cl | $NHCONH_2$ | $C_2H_4CN$ | $C_2H_4OCOOC_2H_5$ | " |
| 16 | 3-$CH_3$—$C_6H_4$ | Br | Br | $OSO_2C_6H_5$ | $C_2H_4OCOOC_2H_5$ | $C_2H_4OCOOC_2H_5$ | " |
| 17 | $C_6H_5$ | Cl | Cl | $NHCOOCH_3$ | $C_2H_4COOCH_3$ | $C_2H_4COOCH_3$ | " |
| 18 | $C_6H_5$ | CN | Br | $NHCONHC_6H_5$ | $CH_2CH(C_2H_5)$—$OCOOCH_3$ | $CH_2CH(C_2H_5)$—$OCOOCH_3$ | red |
| 19 | 3,5-$CH_3$-4-Cl—$C_6H_2$ | Cl | Cl | $NHCOCH_3$ | $C_2H_4OCOCH_3$ | $C_2H_4OCOCH_3$ | scarlet |
| 20 | $C_6H_5$ | Cl | Cl | $NHCOCF_3$ | $C_2H_4OCOOC_2H_5$ | $C_2H_4OCOOC_2H_5$ | scarlet |
| 21 | 3-Cl—$C_6H_4$ | $NO_2$ | Cl | $NHSO_2C_4H_9$ | $C_2H_4CN$ | $C_2H_4OCOC_6H_5$ | red |
| 22 | $C_6H_5$ | $OCH_3$ | $OCH_3$ | $OSO_2CH_3$ | $C_2H_4OCOOCH_3$ | $C_2H_4OCOOCH_3$ | red |
| 23 | 3-$CH_3$—$C_6H_4$ | CN | CN | $NHCOCH_3$ | $C_2H_4OSO_2C_6H_5$ | $C_2H_4OSO_2C_6H_5$ | red |
| 24 | 4-$CH_3$—$C_6H_4$ | $CF_3$ | $CF_3$ | $NHCOCH_3$ | $C_2H_4OCOCH_3$ | $C_2H_4OCOCH_3$ | scarlet |
| 25 | $C_6H_5$ | Cl | Cl | $NHCOCH_3$ | $C_2H_4OSO_2CH_3$ | $C_2H_4OSO_2CH_3$ | scarlet |
| 26 | 3-Cl—$C_6H_4$ | Cl | Cl | $NHCOCH_3$ | $C_2H_4OSO_2C_4H_9$ | $C_2H_4OSO_2C_4H_9$ | scarlet |
| 27 | $C_6H_5$ | Cl | Cl | $NHCOCH_3$ | H | $C_2H_5$ | scarlet |
| 28 | 3-$NO_2$—$C_6H_4$ | Cl | Cl | H | $C_2H_5$ | $CH_2C_6H_5$ | orange |
| 29 | $C_6H_5$ | Cl | Cl | $CH_3$ | $C_2H_4OCH_3$ | $C_2H_4OCH_3$ | yellowish-tinged scarlet |
| 30 | $C_6H_5$ | Cl | Cl | $OCH_3$ | $C_2H_5$ | $C_2H_5$ | yellowish-tinged scarlet |
| 31 | $C_6H_5$ | Cl | Cl | Cl | —$CH_2$—$CH$=$CH_2$ | —$CH_2$—$CH$=$CH_2$ | orange-brown |
| 32 | 3-Cl—$C_6H_4$ | Cl | Cl | $NHCOCH_3$ | $C_2H_4OCOOCH_3$ | $C_2H_4OCOOCH_3$ | scarlet |

| Example | $R_1$ | $R_2$ | $R_3$ | $R_7$ | $R_8$ | $R_9$ | Colour shade |
|---|---|---|---|---|---|---|---|
| 33 | 3-Cl—$C_6H_4$ | Cl | Cl | $C_6H_5$ | $CH_3$ | H | orange |
| 34 | $C_6H_5$ | Cl | Cl | $C_6H_5$ | $CH_3$ | H | orange |
| 35 | 3-$CH_3$—$C_6H_4$ | Cl | Cl | $C_6H_5$ | $C_2H_5$ | H | orange |
| 36 | $C_6H_5$ | $NO_2$ | H | $C_6H_5$ | $C_2H_4OH$ | H | orange |
| 37 | 3,5-$CH_3$—$C_6H_3$ | $CH_3$ | $CH_3$ | $C_6H_5$ | $CH_2$—$CH(OH)$—$C_2H_5$ | H | orange |
| 38 | 3-$NO_2$—$C_6H_4$ | $CF_3$ | Cl | $C_6H_5$ | $CH_3$ | H | orange |
| 39 | $C_6H_5$ | Br | Br | $C_6H_5$ | $C_4H_9$ | H | orange |
| 40 | 3-Cl—$C_6H_4$ | CN | Br | $C_2H_5$ | $CH_3$ | H | golden yellow |
| 41 | 3-$CH_3$—$C_6H_4$ | $NO_2$ | Cl | $CH_3$ | $CH_3$ | H | golden yellow |
| 42 | $C_6H_5$ | $OCH_3$ | $OCH_3$ | $C_4H_9$ | $CH_3$ | H | gplden yellow |
| 43 | $C_6H_5$ | CN | CN | $C_6H_5$ | $CH_3$ | H | orange |

-continued

| Example | R₁ | R₂ | R₃ | R₇ | R₈ | R₉ | Colour shade |
|---|---|---|---|---|---|---|---|
| 44 | 3-Cl—C₆H₄ | CF₃ | CF₃ | C₆H₅ | CH₃ | H | orange |
| 45 | 3-Cl—C₆H₄ | Cl | H | C₆H₅ | CH₃ | H | orange |
| 46 | C₆H₅ | NO₂ | H | C₆H₅ | CH₃ | H | orange |
| 47 | 3-Cl—C₆H₄ | Cl | Cl | C₆H₅ | H | H | orange |
| 48 | C₆H₅ | Cl | Cl | CH₃ | —CH₂—C₆H₅ | H | golden yellow |
| 49 | C₆H₅ | Cl | Cl | C₆H₅ | —C₂H₄—C₆H₅ | H | orange |
| 50 | 3-CH₃—C₆H₄ | Cl | Cl | C₆H₅ | CH₃ | 7-C₂H₅ | orange |
| 51 | C₆H₅ | Cl | Cl | C₆H₅ | CH₃ | 5-Cl | orange |
| 52 | C₆H₅ | Cl | Cl | 4-CH₃—C₆H₄ | CH₃ | H | orange |
| 53 | C₆H₅ | Cl | Cl | C₆H₅ | C₄H₉ | H | orange |

EXAMPLES 54–69

The procedure followed is as indicated in Example 1, but the dyestuffs of the formula

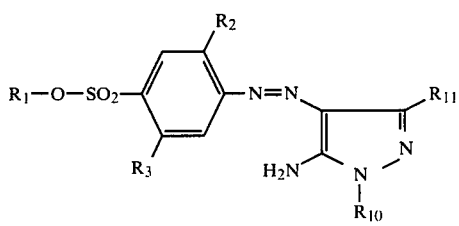

described in the table below are used.

| Example | R₁ | R₂ | R₃ | R₁₀ | R₁₁ | Colour shade |
|---|---|---|---|---|---|---|
| 54 | 3-CH₃—C₆H₄ | Cl | Cl | C₆H₅ | CH₃ | yellow |
| 55 | C₆H₅ | Cl | Cl | C₆H₅ | CH₃ | yellow |
| 56 | 3-Cl—C₆H₄ | Cl | Cl | C₆H₅ | CH₃ | yellow |
| 57 | C₆H₅ | NO₂ | H | C₆H₅ | CH₃ | yellow |
| 58 | 3-CH₃—C₆H₄ | CH₃ | CH₃ | 2-Cl—C₆H₄ | CH₃ | yellow |
| 59 | C₆H₅ | CF₃ | Cl | —CH₂—C₆H₅ | CH₃ | yellow |
| 60 | C₆H₅ | Br | Br | —C₄H₉ | CH₃ | yellow |
| 61 | 3-NO₂—C₆H₄ | Cl | Cl | —CH₂—CH—CH₃<br>\|<br>OH | CH₃ | yellow |
| 62 | C₆H₅ | CN | Br | 3-NO₂—C₆H₄— | CH₃ | yellow |
| 63 | 3-CH₃—C₆H₄ | NO₂ | Cl | 2,5-Cl—C₆H₃ | CH₃ | yellow |
| 64 | C₆H₅ | OCH₃ | OCH₃ | C₆H₅ | COOC₂H₅ | yellow |
| 65 | C₆H₅ | CN | CN | C₆H₅ | CH₃ | yellow |
| 66 | 3-Cl—C₆H₄ | CF₃ | CF₃ | C₆H₅ | CH₃ | yellow |
| 67 | 3-Cl—C₆H₄ | Cl | H | 4-CH₃—C₆H₄ | CH₃ | yellow |
| 68 | 3,5-CH₃—C₆H₃ | Cl | Cl | C₆H₅ | CH₃ | yellow |
| 69 | 3-CH₃—C₆H₄ | NO₂ | H | C₆H₅ | CH₃ | yellow |

EXAMPLE 70

(a) 50–200 parts of the dyestuff of the formula

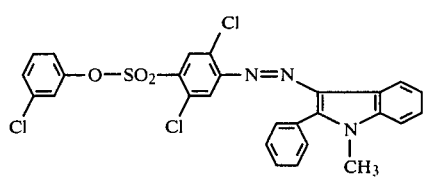

are brought together with 25 to 100 parts of a non-ionic dispersing agent, the mixture is made up to 1,000 parts with water and dispersion is effected in a ball mill or another apparatus. In order to prevent the dyestuff paste from drying out too rapidly, a small amount of preservative and glycols or glycerol can also be added to the paste.

(b) A PES/CO 65:35 fabric is printed with a printing paste consisting of

| | |
|---|---|
| 1–50 parts | of the dyestuff paste from paragraph a) |
| 100 parts | of the boric acid ester of polyethylene glycol (molecular weight: 300) |
| 399–350 parts | of water and |
| 500 parts | of a 4% strength alginate thickener |
| 1,000 parts | | using a rotary screen printing machine or screen printing tables.

An orange print which is fast to washing and light is obtained.

We claim:

1. Process for dyeing and printing cellulose fibres swollen with water-miscible swelling agents or fibre blends containing these fibres, characterised in that the fibres are treated with dyestuffs of the general formula

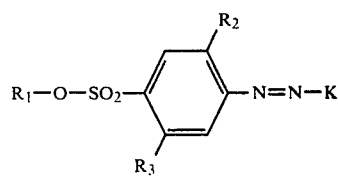

wherein
R₁ represents aryl,
R₂ represents halogen, CN, CF₃, NO₂, Q₁, —OQ₁, —COOQ₁, —CONQ₁Q₂ or —NHCOQ₁,
R₃ represents H, halogen, CN, CF₃, Q₁ or —OQ₁ and
K represents the radical of a coupling component,
wherein
Q₁ denotes alkyl or aryl and
Q₂ denotes hydrogen, alkyl or aralkyl, and the dyestuffs are fixed by heat treatment.

2. Process according to claim 1, characterised in that the fibres are treated with dyestuffs of the formula of claim 1 wherein K represents the radical of an aniline coupling component which couples in the 4-position, the radical of an indole coupling component which couples in the 3-position or the radical of a 5-aminopyrazole coupling component which couples in the 4-position.

3. Process according to claim 1, characterised in that the fibres are treated with dyestuffs of the formula

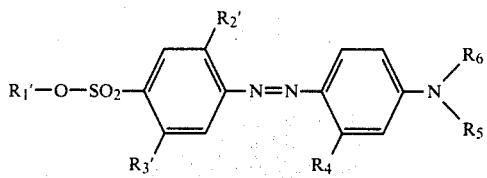

wherein $R_1'$ represents phenyl, which is optionally mono-, di- or tri-substituted by $C_1$-$C_4$-alkyl or halogen, $R_2'$ represents halogen, CN, $CF_3$, $NO_2$, $C_1$-$C_4$-alkyl or $C_1$-$C_4$-alkoxy, $R_3'$ represents halogen, CN, $CF_3$, $C_1$-$C_4$-alkyl or $C_1$-$C_4$-alkoxy, $R_4$ represents hydrogen, halogen, alkyl, —$NHCOQ_1$, —$NHSO_2Q_1$, —$NHCONH_2$, —$NHCONQ_1Q_2$, —$NHCOCF_3$, —$NHCOOQ_1$, alkoxy or —O—$SO_2$—$Q_1$, $R_5$ and $R_6$, which can be identical or different, represent hydrogen, $C_1$-$C_4$-alkyl, —$C_1$-$C_4$-alkylene—O—CO—$Q_1$, $C_1$-$C_4$-alkylene—O—CO—O—$Q_1$, $C_1$-$C_4$-alkylene—CO—O—$Q_1$, $C_1$-$C_4$-alkylene—$CONQ_1Q_2$, $C_1$-$C_4$-alkylene—O—$Q_1$, $C_1$-$C_4$-alkylene—O—CO—NH—$Q_1$, $C_1$-$C_4$-alkylene—O—$SO_2$-$Q_1$, aralkyl, —$CH_2$—CH=$CH_2$ or —$CH_2CH_2CN$ and $Q_1$ and $Q_2$ have the abovementioned meaning, and the dyestuffs are fixed by heat treatment, 4. Process according to claim 1, characterised in that the fibres are treated with dyestuffs of the formula

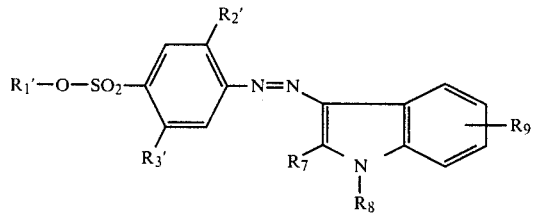

wherein $R_7$ represents $C_1$-$C_4$-alkyl or phenyl, $R_8$ represents $C_1$-$C_4$-alkyl, benzyl or phenethyl, $R_9$ represents hydrogen, halogen or alkyl and $R_1'$, $R_2'$ and $R_3'$ have the abovementioned meaning, and the dyestuffs are fixed by heat treatment.

5. Process according to claim 1, characterised in that the fibres are treated with dyestuffs of the formula

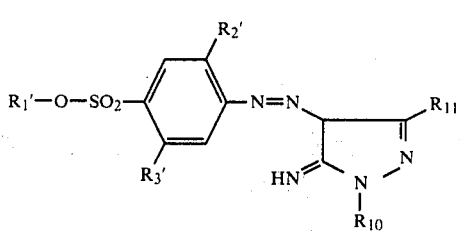

wherein $R_{10}$ represents $Q_2$, aryl, cycloalkyl or the radical of a heterocyclic compound and $R_{11}$ represents $Q_1$, —$COOQ_2$ or —$CON(Q_2)_2$, and wherein $R_1'$, $R_2'$, $R_3'$, $Q_1$ and $Q_2$ have the abovementioned meaning, and the dyestuffs are fixed by heat treatment.

6. Process according to claim 1, characterised in that the fibres are treated with dyestuffs of the formula

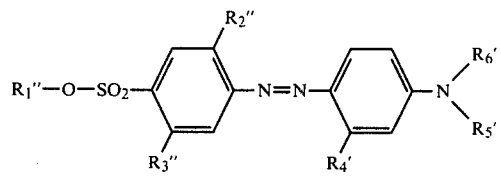

wherein $R_1''$ represents phenyl, tolyl or chlorophenyl, $R_2''$ represents halogen, nitro or cyano, $R_3''$ represents halogen, $R_4'$ represents —$NHCOCH_3$, —$NHCOC_2H_5$, —$NHCOC_3H_7$, —$NHCOC_4H_9$, —$NHCOC_6H_5$ or —$NHSO_2CH_3$, —$NHSO_2C_4H_9$ or —$NHSO_2C_6H_5$ and $R_5'$ and $R_6'$, which can be identical or different, represent —$C_2H_4$—O—CO—$CH_3$, —$C_2H_4$—O—$COC_2H_5$, —$C_2H_4$—O—CO—$C_6H_5$, —$C_2H_4$—O—CO—O—$CH_3$, —$C_2H_4$—O—CO—O—$C_2H_5$, —$C_2H_4$—O—CO—NH—$CH_3$, —$C_2H_4$—O—CO—NH—$C_4H_9$, —$C_2H_4$—O—CO—NH—$C_6H_5$ or —$C_2H_4CN$, and the dyestuffs are fixed by heat treatment.

7. Process according to claim 1, characterised in that the fibres are treated with dyestuffs of the formula

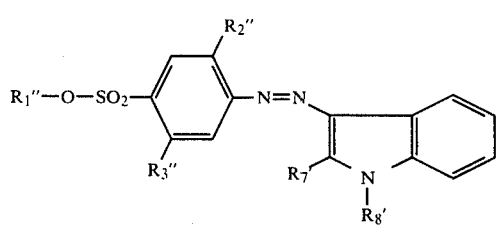

wherein $R_7'$ represents phenyl, $R_8'$ represents $C_1$-$C_4$-alkyl and $R_1''$, $R_2''$ and $R_3''$ have the abovementioned meaning, and the dyestuffs are fixed by heat treatment.

8. Process according to claim 1, characterised in that the fibres are treated with dyestuffs of the formula

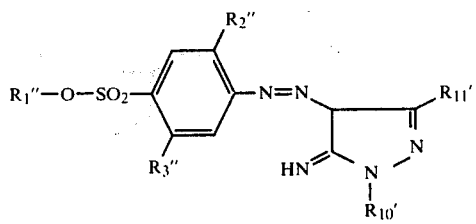

wherein
R$_{10}'$ represents phenyl and
R$_{11}'$ represents methyl,
and wherein
R$_1''$, R$_2''$ and R$_3''$ have the abovementioned meaning, and the dyestuffs are fixed by heat treatment.

9. Formulation for dyeing and printing cellulose fibres swollen with water-miscible swelling agents or fibre blends containing these fibres, characterised in that it cotains one or more dyestuffs of the formula of claim 1.

* * * * *